US009234792B2

(12) United States Patent
Miyauchi (10) Patent No.: US 9,234,792 B2
(45) Date of Patent: Jan. 12, 2016

(54) LIGHT INTENSITY MONITOR CAPABLE OF DETECTING LIGHT INTENSITY AND FIBER BREAKING (71) Applicant: Fujikura Ltd., Koto-ku, Tokyo (JP)

(72) Inventor: Hidenori Miyauchi, Sakura (JP)

(73) Assignee: FUJIKURA LTD., Tokyo (JP)

( * ) Notice: Subject to any disclaimer, the term of this patent is extended or adjusted under 35 U.S.C. 154(b) by 609 days.

(21) Appl. No.: 13/628,947

(22) Filed: Sep. 27, 2012

(65) Prior Publication Data

US 2013/0020474 A1 Jan. 24, 2013

Related U.S. Application Data (63) Continuation of application No. PCT/JP2011/057652, filed on Mar. 28, 2011.

(30) Foreign Application Priority Data

Mar. 30, 2010 (JP) ................................ 2010-078968

(51) Int. Cl.
*G01J 1/42* (2006.01)
*B23K 26/04* (2014.01)
*G02B 6/02* (2006.01)
(Continued)

(52) U.S. Cl.
CPC .............. *G01J 1/4257* (2013.01); *B23K 26/04* (2013.01); *G01M 11/31* (2013.01); *G02B 6/02085* (2013.01); *G02B 6/262* (2013.01); *G02B 6/2826* (2013.01); *G01J 1/0425* (2013.01); *H01S 3/005* (2013.01); *H01S 3/0014* (2013.01); *H01S 3/0064* (2013.01); *H01S 3/0675* (2013.01); *H01S 3/09408* (2013.01); *H01S 3/09415* (2013.01); *H01S 3/094011* (2013.01); *H01S 3/10023* (2013.01)

(58) Field of Classification Search
CPC combination set(s) only.
See application file for complete search history.

(56) References Cited

U.S. PATENT DOCUMENTS 7,768,700 B1* 8/2010 Savage-Leuchs ........... 359/341.1
2007/0003288 A1* 1/2007 Tong et al. .................... 398/142
(Continued)

FOREIGN PATENT DOCUMENTS

JP 59-079137 A 5/1984
JP 09-141476 A 6/1997
(Continued)

OTHER PUBLICATIONS

Office Action issued by Chinese Patent Office in Chinese Application No. 201180017668.1 mailed Jan. 6, 2014.
(Continued)

*Primary Examiner* — Francis M Legasse, Jr.
(74) *Attorney, Agent, or Firm* — Sughrue Mion, PLLC (57) ABSTRACT A fiber laser system with a fiber laser device including a fiber laser; a laser output end part; and a delivery fiber. The delivery fiber is constituted by a double cladding fiber. An SFBG is provided on the output end side of the delivery fiber, which reflects part of laser light propagating in the core of the delivery fiber to thereby couple the part of the laser light with a backward-propagating cladding mode propagating in a first cladding in a backward direction. A backward-propagating cladding mode detecting section is provided on the input end side of the delivery fiber, which detects the intensity of backward-propagating light in a cladding mode, which light is the part of the laser light coupled by the SFBG with the backward-propagating cladding mode.

23 Claims, 8 Drawing Sheets (51) Int. Cl.
  *G02B 6/26*    (2006.01)
  *G02B 6/28*    (2006.01)
  *G01M 11/00*   (2006.01)
  *G01J 1/04*        (2006.01)
  *H01S 3/00*        (2006.01)
  *H01S 3/067*       (2006.01)
  *H01S 3/10*        (2006.01)
  *H01S 3/094*       (2006.01)
  *H01S 3/0941*      (2006.01)

(56) References Cited

U.S. PATENT DOCUMENTS

2008/0089644 A1* 4/2008 Lee et al. .................. 385/33
2009/0034901 A1* 2/2009 Takabayashi et al. .......... 385/12

FOREIGN PATENT DOCUMENTS

| JP | 11-133255 A | 5/1999 |
| JP | 2003-050322 A | 2/2003 |
| JP | 2004-085310 A | 3/2004 |
| JP | 2005-125398 A | 5/2005 |
| JP | 2006-292674 A | 10/2006 |
| WO | WO 2009/112815 † | 9/2009 |

OTHER PUBLICATIONS

Office Action issued by Chinese Patent Office in Chinese Patent Application No. 201180017668.1 mailed Aug. 26, 2014.

* cited by examiner
† cited by third party

LIGHT INTENSITY MONITOR CAPABLE OF DETECTING LIGHT INTENSITY AND FIBER BREAKING

This application is a Continuation of PCT International Application No. PCT/JP2011/057652 filed in Japan on Mar. 28, 2011, which claims the benefit of Patent Application No. 2010-078968 filed in Japan on Mar. 30, 2010, the entire contents of which are hereby incorporated by reference.

TECHNICAL FIELD

The present invention relates to a method of monitoring the intensity of light from a fiber laser, and particularly relates to a light intensity monitor capable of detecting the light intensity and fiber breaking even in a case where high-power light propagates in the delivery fiber.

BACKGROUND ART

When material processing is carried out with laser light, a laser power of only about several watts may be sufficient depending on the material to be processed. However, in a case where for example thick metal is to be processed, a laser power on the order of kilowatts is necessary. Examples of a laser source for metal processing include a YAG laser, a $CO_2$ laser, an excimer laser and a fiber laser. Out of these, a fiber laser is a high-efficient, high-gain laser that produces good-quality laser light. Since the fiber laser is mainly constituted by optical fibers, the fiber laser is attracting attention as a laser source that is easy to maintain.

A fiber laser also has the following advantage. A path through which laser light propagates is also made of optical fibers, and for example the length of a delivery fiber that connects an output end part through which the laser light is outputted and a main body of the fiber laser is freely changeable. Therefore, it is possible to carry out material processing by moving only the output end part without moving the main body.

As is clear from above, a delivery fiber needs to be movable freely to some extent. Therefore, the delivery fiber may be more prone to breaks than the main body. If a break occurs in the delivery fiber, high-power light may be emitted from a site of the break and pass through a hose etc. that protects the delivery fiber. If this is the case, the light may escape into a surrounding area.

In view of this, for safety reasons, it is necessary to detect a break in the delivery fiber. Further, the stability of the power of laser light to be emitted is important for the purpose of achieving stable processing. Therefore, it is necessary to stabilize, by use of a light intensity monitoring circuit, the intensity of laser light to be outputted.

Conventionally, there has been a light monitoring device as shown in Patent Literature 1. The light monitoring device is a device in which (i) a slanted Bragg grating is provided in a core of an optical fiber so that light guided through the core is partly emitted to the outside of the optical fiber and (ii) a photoreceptor detects the light thus emitted. Further, Patent Literature 2 discloses a method of detecting scattered light leaking from a fused part of a fiber by another fiber near the fused part.

CITATION LIST

Patent Literatures

Patent Literature 1
Japanese Patent Application Publication, Tokukaihei, No. 11-133255 A (Publication Date: May 21, 1999)

Patent Literature 2
Japanese Patent Application Publication, Tokukai, No. 2006-292674 A (Publication Date: Oct. 26, 2006)

SUMMARY OF INVENTION

Technical Problem

According to Patent Literature 1, the light intensity is monitored by (i) causing, by the slanted Bragg grating provided on the output end side of the optical fiber, part of light guided in the core to be emitted to the outside of the optical fiber and (ii) detecting the emitted light by the photoreceptor. However, such a configuration has the following problems. That is, it is necessary to provide the photoreceptor etc. on the output end side and thus the output end part increases in size. Further, a complicated structure is needed to realize communication between the output end part and a main body (for example, an electrical wire is fed through a protection hose so that a photocurrent generated by the photoreceptor is transmitted through the electrical wire).

On the other hand, Patent Literature 2 monitors, via another optical fiber, light scattered from the fused part. However, fused parts and reinforced portions of the delivery fiber are not desirable because the delivery fiber is required to have flexibility. Further, Patent Literature 2 has the same problem as Patent Literature 1, i.e., the output end part increases in size, in a case where such a light monitoring device is provided on the output end side of the delivery fiber.

The present invention has been made in view of the above problems, and an object of the present invention is to provide a light intensity monitoring circuit that (i) does not require a complicatedly structured output end part, (ii) is capable of detecting the intensity of laser light propagating in a delivery fiber with high accuracy and (iii) is also capable of detecting a break in a path through which the laser light propagates.

Solution to Problem

In order to attain the above object, a light intensity monitoring circuit of the present invention includes: a delivery fiber constituted by a double cladding fiber including (i) a core, (ii) a first cladding that encloses the core and (iii) a second cladding that encloses the first cladding; reflecting means for reflecting a part of laser light that propagates in the core of the delivery fiber, thereby coupling the part of the laser light with a backward-propagating cladding mode that propagates in the first cladding in a backward direction, the reflecting means being provided on an output end side of the delivery fiber; and detecting means for detecting intensity of backward-propagating light in a cladding mode which light is the part of the laser light coupled by the reflecting means with the backward-propagating cladding mode, the detecting means being provided on an input end side of the delivery fiber.

According to the configuration, (i) the part of the laser light propagating in the core is fed back by the reflecting means to the input end side as the backward-propagating light in the cladding mode, which reflecting means is provided on the output end side of the delivery fiber and (ii) the intensity of the backward-propagating light in the cladding mode is detected by the detecting means provided on the input end side of the delivery fiber. Accordingly, detection of the intensity of laser light outputted through the output end part and detection of a break in the delivery fiber do not have to be carried out at the output end side of the delivery fiber. This makes it possible to prevent the output end part from becoming larger than necessary and prevent a structure that realizes communication between the output end part and a main body from becoming complicated.

Advantageous Effects of Invention

According to a light intensity monitoring circuit of the present invention, detection of the intensity of laser light outputted through an output end part and detection of a break in a delivery fiber do not have to be carried out at the output end side of the delivery fiber. This makes it possible to prevent the output end part from becoming larger than necessary and prevent a structure that realizes communication between the output end part and a main body from becoming complicated.

DESCRIPTION OF EMBODIMENTS

Figure 1:
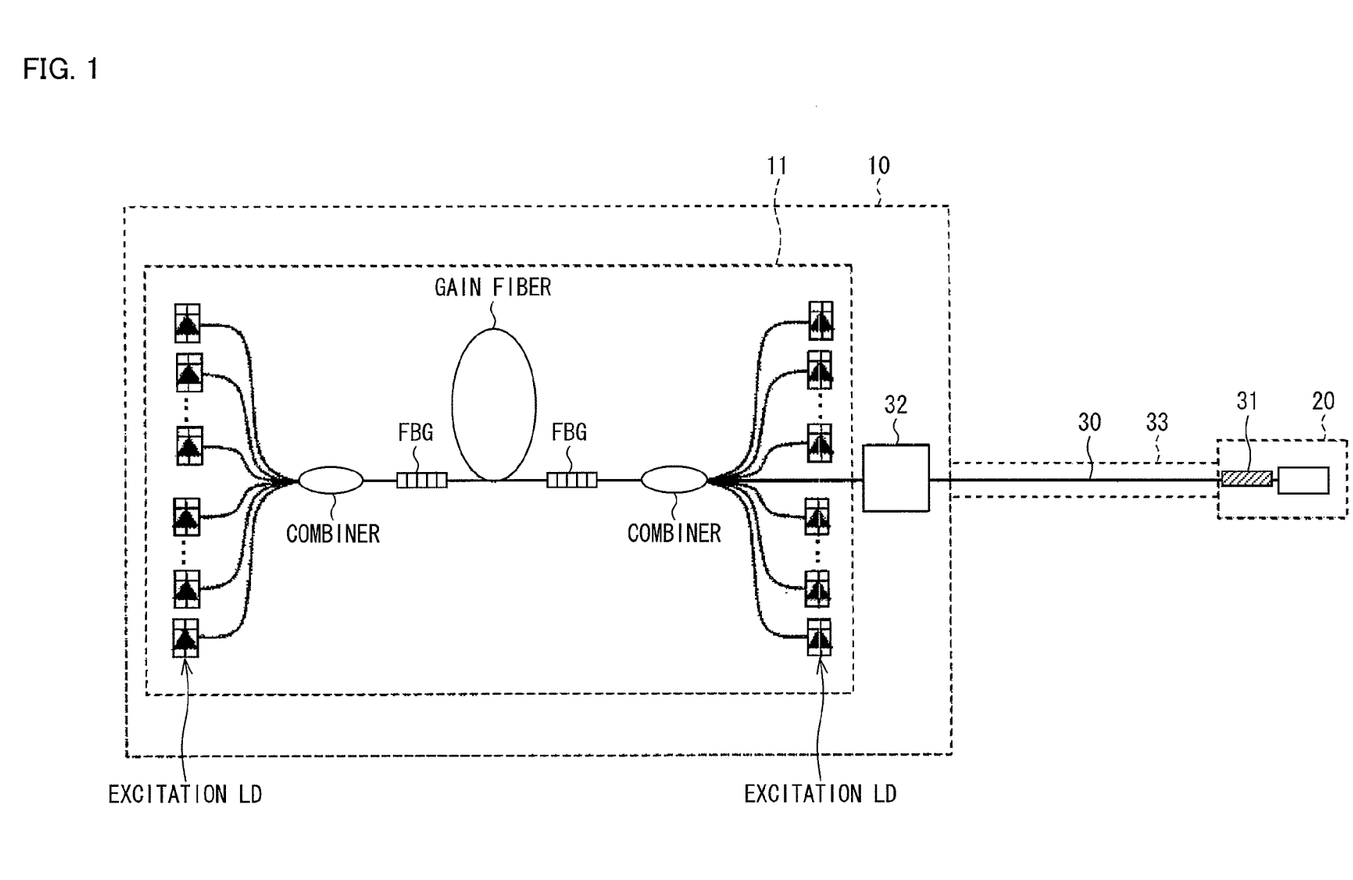
FIG. 1, showing an embodiment of the present invention, is a view schematically illustrating a configuration of a fiber laser system including a light intensity monitoring circuit.

The following description discusses embodiments of the present invention in detail. FIG. 1 is a view schematically illustrating a configuration of a fiber laser system that includes a light intensity monitoring circuit in accordance with the present embodiment (hereinafter referred to as the light intensity monitoring circuit).

A fiber laser system shown in FIG. 1 includes (i) a fiber laser device 10 including a fiber laser 11, (ii) a laser output end part 20, and (iii) a delivery fiber 30 which connects the fiber laser device 10 and the laser output end part 20. Since the fiber laser 11 has a well known configuration, detailed descriptions of the fiber laser 11 are omitted here.

The light intensity monitoring circuit is configured such that (i) the delivery fiber 30 is a double cladding fiber and (ii) a slanted fiber Bragg grating (hereinafter referred to as SFBG; reflecting means) 31 and a backward-propagating cladding mode detecting section 32 are provided to the delivery fiber 30. The SFBG 31 is provided on the output end side of the delivery fiber 30, and couples part of laser light that is guided in a core of the delivery fiber 30 with a backward-propagating cladding mode. The backward-propagating cladding mode detecting section (detecting means) 32 is means for detecting the intensity of backward-propagating light in a cladding mode, and is provided on the input end side of the delivery fiber 30. Further, the delivery fiber 30 is covered with a protection hose 33. It should be noted that the phrase "SFBG 31 is provided on the output end side of the delivery fiber 30" includes (i) a case where the SFBG 31 is provided, near the output end of the delivery fiber 30, as a part of the delivery fiber 30 and (ii) a case where the SFBG 31 is connected to the output end part of the delivery fiber 30. Similarly, the phrase "the backward-propagating cladding mode detecting section 32 is provided on the input end side of the delivery fiber 30" includes (i) a case where the backward-propagating cladding mode detecting section 32 is provided, near the input end of the delivery fiber 30, as a part of the delivery fiber 30 and (ii) a case where the backward-propagating cladding mode detecting section 32 is connected to the input end of the delivery fiber 30.

The light intensity monitoring circuit detects the intensity of laser light and a break in the delivery fiber 30 by (i) causing part of the laser light to return from the laser output end part 20 side (output end side) of the delivery fiber 30 to the fiber laser device 10 side (input end side) and (ii) detecting the part of the laser light thus returned. Therefore, by setting the reflectivity of the SFBG 31 according to the responsivity of the detecting means, it is possible to monitor the intensity of laser light even in a case where the laser light is high-power light. Further, this prevents the laser output end part 20 of the delivery fiber 30 from becoming larger than necessary, and eliminates the need for a complicated structure to realize communication between the laser output end part 20 and the fiber laser device 10. The reasons therefor are described below in detail.

Figure 2:
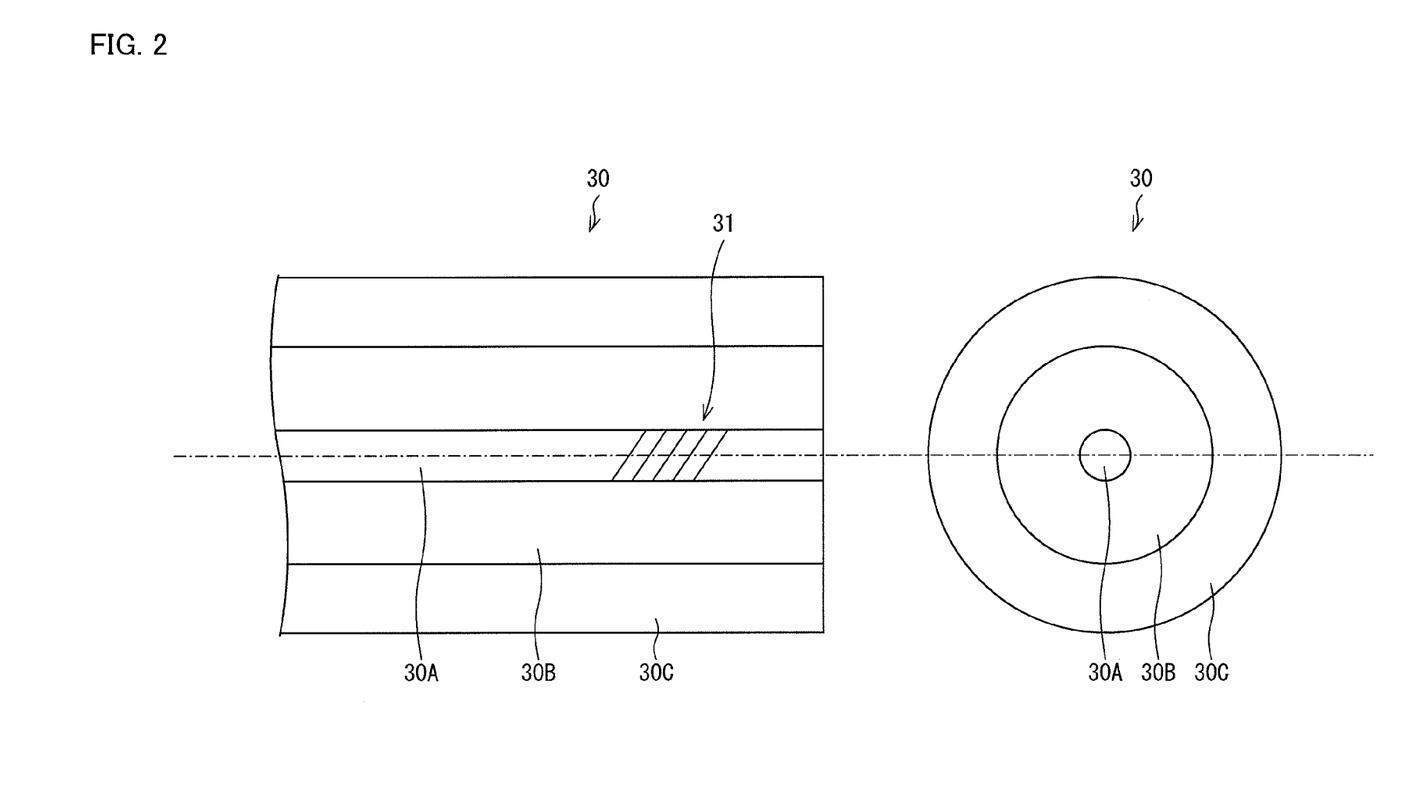
FIG. 2 is a view schematically illustrating a configuration of a delivery fiber for use in the fiber laser system shown in FIG. 1.

As illustrated in FIG. 2, the light intensity monitoring circuit is configured such that the delivery fiber 30 is a double cladding fiber, i.e., the delivery fiber 30 includes a core 30A, a first cladding 30B that has a lower refractive index than the core 30A, and a second cladding 30C that has a lower refractive index than the first cladding 30B. That is, the delivery fiber 30 has such a structure that (i) the core 30A is enclosed by the first cladding 30B and (ii) the first cladding 30B is enclosed by the second cladding 30C. Further, the SFBG 31 is provided in the core 31A of the delivery fiber 30.

Figure 3:
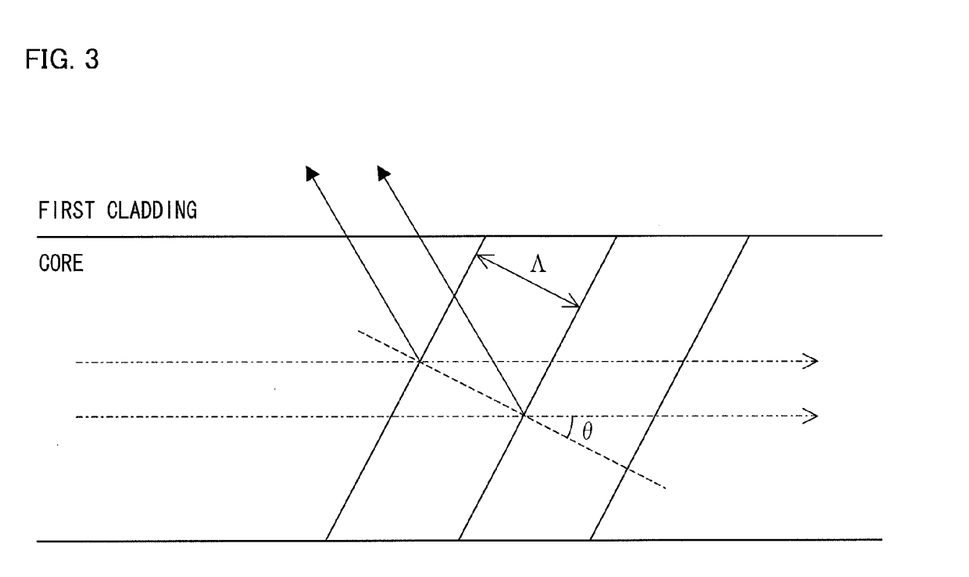
FIG. 3 is a view illustrating a slanted fiber Bragg grating provided in the delivery fiber shown in FIG. 2.

As illustrated in FIG. 3, the SFBG 31 is constituted by planes in each of which the refractive index has been increased. Each of the planes is slanted such that a slant angle (an angle between a normal to the planes in which the refractive index has been increased and a longitudinal axis of an optical fiber) is θ. Since the planes of the SFBG 31 in which surface the refractive index has been increased are slanted, (i) coupling of a forward-propagating core mode that propagates in a forward direction with a backward-propagating core mode that propagates in a backward direction is suppressed and (ii) coupling of the forward-propagating core mode that propagates in the forward direction with a backward-propagating cladding mode that propagates in the backward direction is promoted. Note that the wavelength of the forward-propagating core mode to be coupled with the backward-propagating cladding mode depends on a grating period ($\Lambda$).

In order for the SFBG 31 to couple the forward-propagating core mode with the backward-propagating cladding mode, it is necessary that the refractive index n of the core, wavelength $\lambda_B$ of laser light, grating period $\Lambda$, and slant angle $\theta$ satisfy the Bragg condition represented by the following equation:

$$N \times (\lambda_B/n) = 2\Lambda \cos \theta \text{ (where } N \text{ is an integer)}.$$

Further, a relationship between the reflectivity R and the slant angle $\theta$ of the SFBG 31 is represented by the following equation:

$$R = \tanh^2(\pi L \Delta n \eta / \lambda_B)$$
$$= \tanh^2((\pi L \Delta n \eta / 2n\Lambda \cos\theta) \times N)$$

where L is the length of a grating,
$\eta$ is confinement factor in the core, and
$\Delta n$ is an increase in refractive index.

Light coupled with the backward-propagating cladding mode (such light is hereinafter referred to as "backward-propagating light in a cladding mode") is confined in the first cladding 30B, and propagates through the first cladding 30B in a direction opposite to a direction in which laser light propagates through the core. The intensity of the backward-propagating light in the cladding mode is detectable by the backward-propagating cladding mode detecting section 32 provided on the input end side of the delivery fiber 30.

Figure 4:
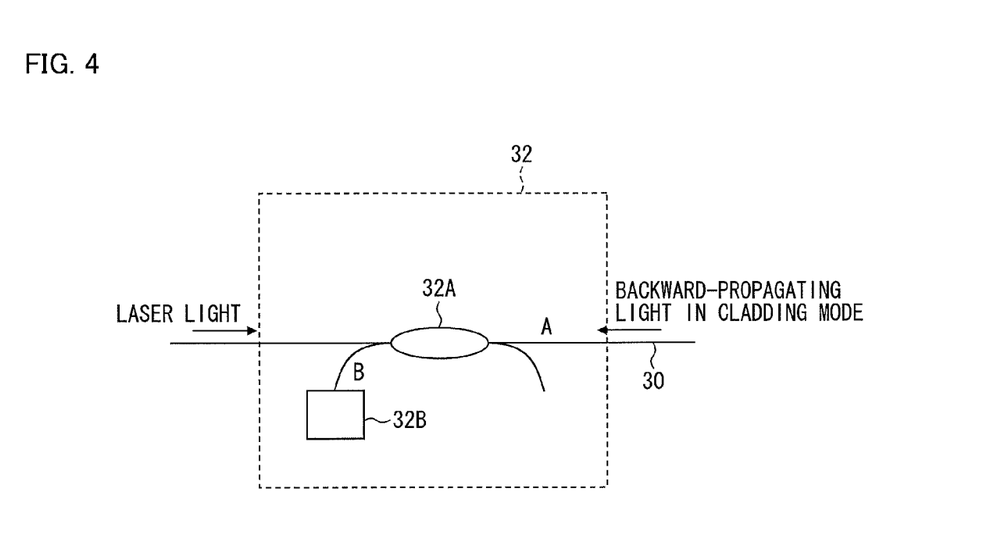
FIG. 4 is a view illustrating an example of a configuration of a backward-propagating cladding mode detecting section for use in the fiber laser system shown in FIG. 1.
Figure 5:
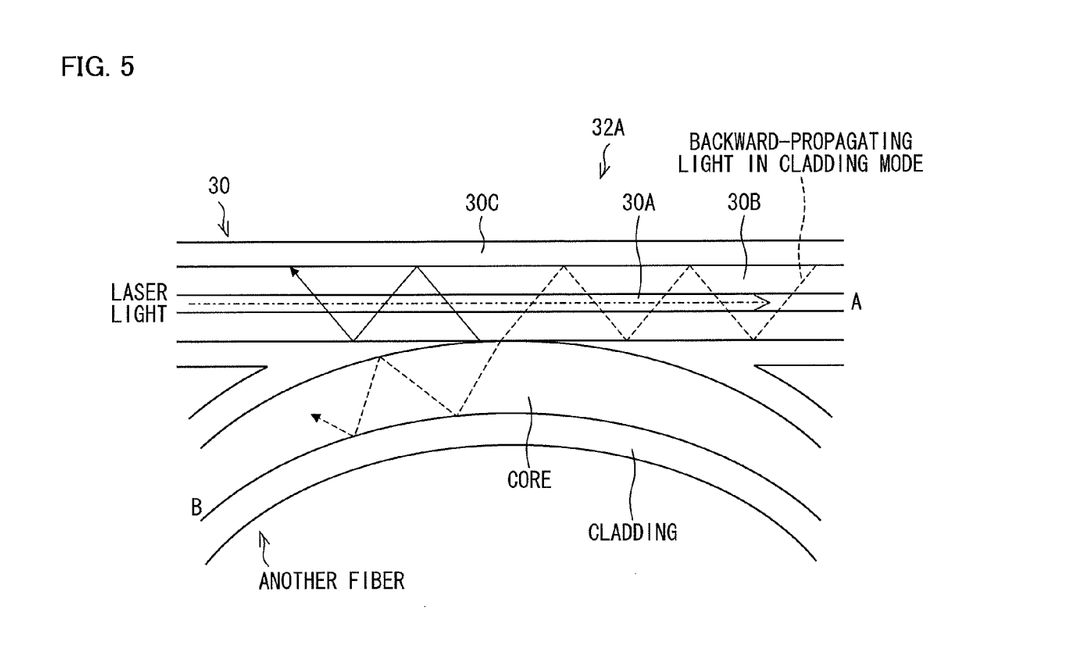
FIG. 5 is a view illustrating a configuration of a directional coupler for use in the backward-propagating cladding mode detecting section shown in FIG. 4.

The backward-propagating cladding mode detecting section 32 is for example constituted by, as shown in FIG. 4, a directional coupler 32A and a light detector 32B (e.g., photodiode). A usual directional coupler utilizes a phenomenon in which, in two optical fibers that are jointed so that their cores are adjacent to each other, light that has entered one of the cores propagates into the other core. Note however that, in the directional coupler 32A used here, the first cladding 30B of the delivery fiber 30 is adjacent to a core of another fiber (see FIG. 5). Accordingly, laser light in the core 30A of the delivery fiber 30 keeps traveling in the core 30A, whereas backward-propagating light in the cladding mode which propagates through the first cladding 30B from the A side of FIG. 5 enters the another fiber. The light which has entered the another fiber propagates in a direction toward B of FIG. 5, and is finally detected by the light detector 32B. This configuration enables detection of the intensity of laser light. Note that, in the directional coupler 32A, the refractive index of the another fiber is set to be smaller than that of the second cladding 30C of the delivery fiber 30.

Figure 6:
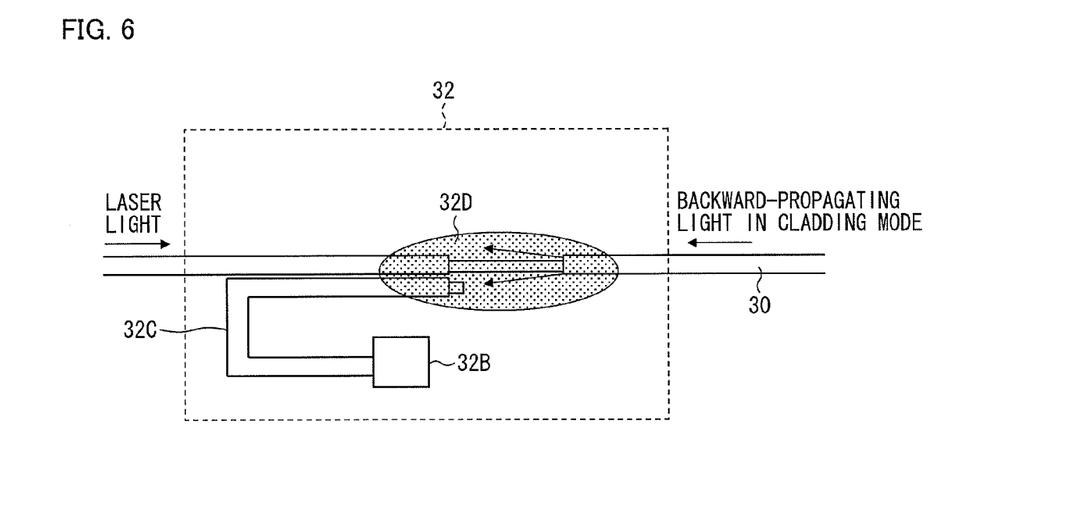
FIG. 6 is a view illustrating another example of a configuration of the backward-propagating cladding mode detecting section for use in the fiber laser system shown in FIG. 1.

Alternatively, the backward-propagating cladding mode detecting section 32 of the present invention can be configured for example as shown in FIG. 6. According to the configuration shown in FIG. 6, (i) a part of the second cladding 30C, which part is in the vicinity of the input end of the delivery fiber 30, is removed and (ii) the part and an end portion of a detection fiber 32C are surrounded by a high-refractive-index medium 32D that has a higher refractive index than the first cladding 30B of the delivery fiber 30. Note here that the end portion of the detection fiber 32C is parallel to the delivery fiber 30. This makes it possible to detect light leaked from around the input end of the delivery fiber 30 by the light detector 32B, by causing the light to enter the detection fiber 32C by means of the high-refractive-index medium 32D. This configuration also enables detection of the intensity of laser light.

Figure 12:
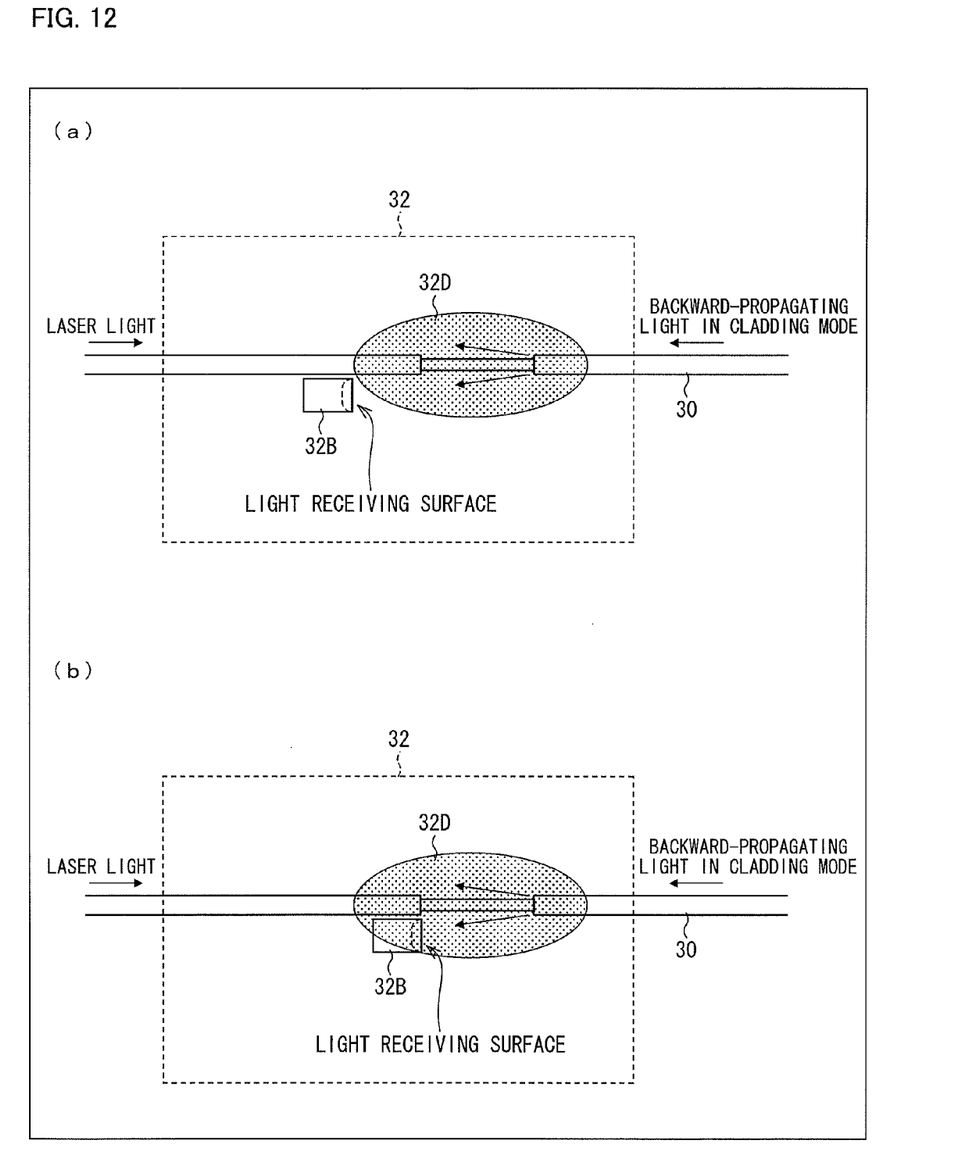
FIG. 12 is a view illustrating a further example of a configuration of the backward-propagating cladding mode detecting section for use in the fiber laser system shown in FIG. 1.

Alternatively, the backward-propagating cladding mode detecting section 32 of the present invention can be configured for example as shown in FIG. 12. According to the configuration shown in FIG. 12, (i) a part of the second cladding 30C, which part is in the vicinity of the input end of the double-cladding delivery fiber 30, is removed and (ii) the part is surrounded by the high-refractive-index medium 32D which has a higher refractive index than the first cladding 30B. In addition, the light detector 32B is provided inside or outside the high-refractive-index medium 32D. This makes it possible for a light receiving surface of the light detector 32B to directly detect the backward-propagating light in the cladding mode scattered by the high-refractive-index medium 32D. This configuration also enables detection of the intensity of laser light.

According to each of the foregoing three examples of a configuration of the backward-propagating cladding mode detecting section 32, the intensity of laser light that propagates through a core is detected without direct detection of the leaser beam that propagates through the core. Accordingly, the each of the foregoing three examples has the following advantage. That is, in a case of using a directional coupler which couples a core mode of the delivery fiber 30 with a core mode of the detection fiber, it is necessary that a coupling rate of the directional coupler be very small, because the laser light which propagates in the core of the delivery fiber 30 is high-power light. However, in order to produce such a directional coupler with a small coupling rate, it is necessary that a core of the directional coupler be long. In a case where the length of the core is increased, some loss occurs in such a long core. Even if the loss is small, the absolute value of energy released is large because the laser light is high-power light. The energy thus released generates heat, and the heat may cause burn damage on the directional coupler. Such a problem does not occur in the backward-propagating cladding mode detecting section 32 of the present embodiment, because it is not the light in a core but the light in a cladding that is to be coupled.

Further, an optical isolator having an isolation of 30 dB or greater can be provided in the fiber laser system so as to be closer to the output side than the SFBG 31 is.

When the fiber laser device is actually used for material processing, laser light emitted from the output end part is absorbed by a target material while part of the laser light is reflected by the target material (reflectivity differs depending on the target material). Reflected laser light re-enters the core and the first cladding at the output end part, and is returned to the main body of the fiber laser. In this case, the backward-propagating cladding mode detecting section detects (1) backward-propagating light in the cladding mode due to reflection by the SFBG, (2) light coupled with the backward-propagating cladding mode due to Rayleigh scattering, and (3) light reflected by the target material. The light (1) to the light (3) each have the same wavelength as laser light.

In a case where the light (3) is detected, the amount of the light (3) is larger than the amount of the sum of the light (1) and the light (2) which are reflected usually. Therefore, a state where there is no break may be falsely recognized as a state where there is a break. In view of this, it is necessary to minimize the effect of the light (3). The optical isolator is provided to prevent the light reflected by the target material from returning to the delivery fiber to thereby reduce the effect of the light (3). In a case where light comes back by specular reflection (reflectivity: 100%), the reflectivity of the sum of the light (1) and the light (2) at the detector increases by up to 1% if the isolation is 20 dB. In a case where the isolation is 30 dB, the reflectivity increases by only up to 0.1%. Accordingly, it is possible to accurately determine whether there is a break even in a case where the reflectivity of the sum of the light (1) and the light (2) is approximately 0.5%.

The following description discusses how to detect a break in the delivery fiber 30. Whether there is a break in the delivery fiber 30 can be determined by a change in the intensity of backward-propagating light in the cladding mode (i.e., a change in the amount of reflected light) from a predetermined expected value. Specifically, in a case of a state where there is no break, the state is determined as normal by detecting the intensity of backward-propagating light in the cladding mode, which intensity corresponds to the intensity of laser light and the reflectivity of the SFBG. On the other hand, in a case where there is a break, Fresnel reflection occurs at a cut surface of the delivery fiber 30, and thus a change occurs in the intensity of the backward-propagating light in the cladding mode. Such a change makes it possible to determine that there is a break.

For example, in a case where the laser output power is X [W] and the reflectivity of the SFBG is R, the intensity of backward-propagating light in the cladding mode is RX [W]. Assume that the entire backward-propagating light in the cladding mode is detected by the detecting means. When the intensity of the laser light changes within a range of (X±x) [W], the intensity of laser light to be detected also changes within a range of R(X±x) [W]. In a case where the intensity of detected laser light is outside the above range with a margin, i.e., in a case where the intensity of detected laser light is not less than a threshold R(X+y) [W] or not more than a threshold R(X−y) [W] (note that y is equal to or greater than x), it is determined that there is a break. By setting the threshold in consideration of also the intensity of light reflected by Rayleigh scattering and the temperature dependence of the laser output, it is possible to more accurately determine whether there is a break.

The following description discusses, in more detail, how to determine whether there is a break in the delivery fiber 30 from the result of detection of backward-propagating light in the cladding mode.

Figure 8:
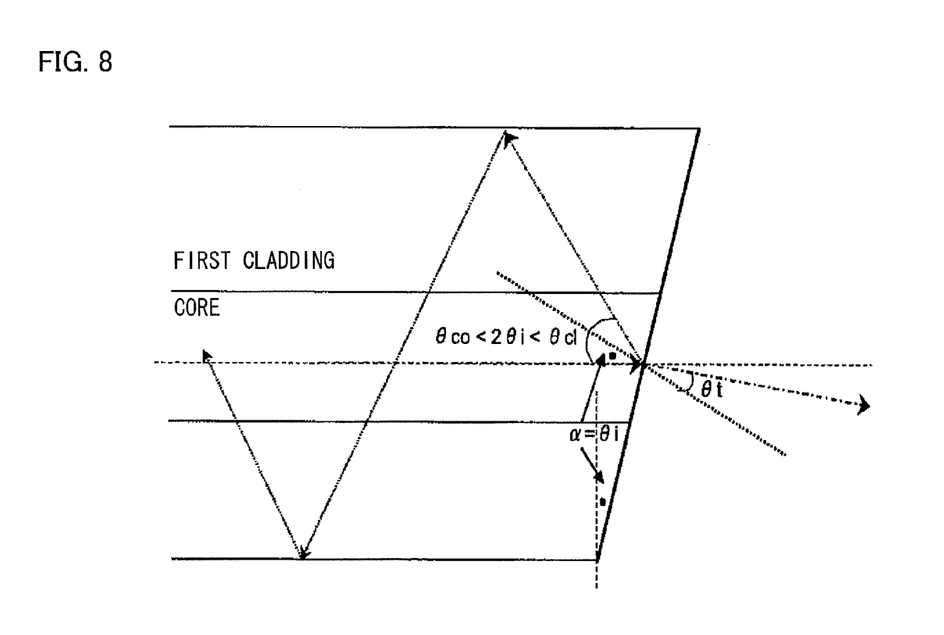
FIG. 8 is a view showing Fresnel reflection via which reflected light becomes a backward-propagating cladding mode, in a case where a break occurs in a fiber such that a cut surface of the fiber is at a constant angle.
Figure 9:
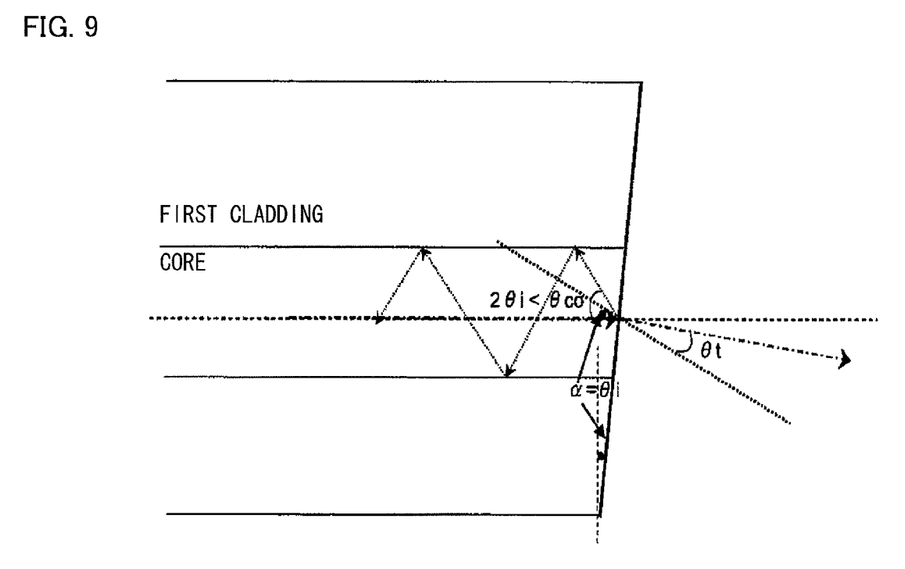
FIG. 9 is a view showing Fresnel reflection via which reflected light becomes a backward-propagating core mode, in a case where a break occurs in a fiber such that a cut surface of the fiber is at a constant angle.
Figure 10:
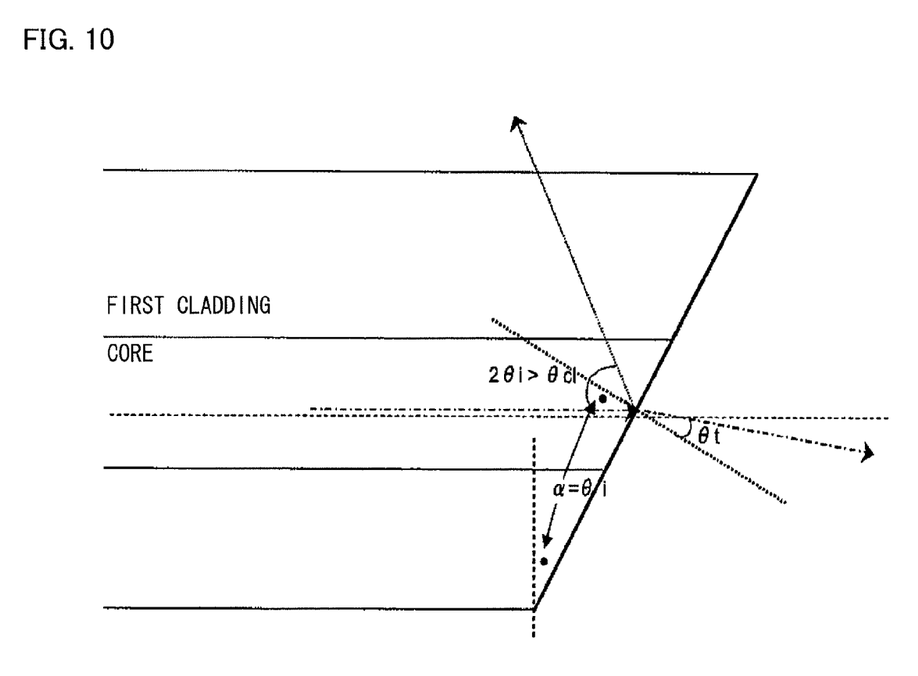
FIG. 10 is a view showing Fresnel reflection via which reflected light becomes a radiation mode, in a case where a break occurs in a fiber such that a cut surface of the fiber is at a constant angle.

In a case where a break develops in the delivery fiber 30, Fresnel reflection occurs at a cut surface of the fiber where there is the break. The proportion of light to be coupled by Fresnel reflection with a cladding mode differs depending on the state of the cut surface of the fiber where there is a break. FIGS. 8 to 10 each show Fresnel reflection that occurs in a case where a break occurs in a fiber (core) such that a cut surface of the fiber (core) is at a constant angle. The constant angle is different among FIGS. 8 to 10. It is assumed here that, for convenience of description, light propagating in a core is a ray that travels in parallel to an optical axis of the core.

As shown in FIG. 8, in a case where the angle α of the cut surface has a certain range, light reflected by Fresnel reflection is coupled with a backward-propagating cladding mode. Note here that the angle α of the cut surface is an angle between the cut surface and a plane perpendicular to an optical axis of the core (or an angle between a normal to the cut surface and an optical axis of the core). However, in a case where the angle α of the cut surface is outside the certain range, the light is coupled with the backward-propagating core mode (refer to FIG. 9) or becomes radiation mode (refer to FIG. 10). The angle α of the cut surface, at which light is reflected by Fresnel reflection so as to be coupled with the backward-propagating cladding mode, satisfies the following equation (1).

$$(1/2) \times \theta co < \theta i = \alpha < (1/2) \times \theta cl \quad (1)$$

In the equation (1), $\theta i$ is an angle of incidence of light reflected by Fresnel reflection, and is equal to the angle of the cut surface. $\theta co$ is a critical angle that depends on an NA (opening) of the core. $\theta cl$ is a critical angle that depends on an NA of the first cladding. For example, assume that the NA and the refractive index of the core are 0.21 and 1.5, respectively, and the NA and the refractive index of the first cladding are 0.46 and 1.45, reflectively. In this case, the angle α of the cut surface, from which reflected light is to be coupled with the backward-propagating cladding mode, is approximately 8.0 degrees to approximately 18.2 degrees. In a case where $2\alpha < \theta co$, the light reflected by Fresnel reflection is coupled with the core. In a case where $2\alpha > \theta cl$, the light is emitted to the outside of the optical fiber. Therefore, in a case where the equation (1) is not satisfied, the backward-propagating cladding mode detecting section 32 detects no light reflected by Fresnel reflection (note, however, that light which has been coupled by Rayleigh scattering with the backward-propagating cladding mode is detected). Accordingly, by setting the reflectivity of the SFBG 31 to be greater than the maximum possible Fresnel reflectivity of a cut surface at which light is reflected by Fresnel reflection so as to be coupled with the backward-propagating cladding mode, it is possible to determine, by a change in the reflectivity, whether there is a break.

Figure 7:
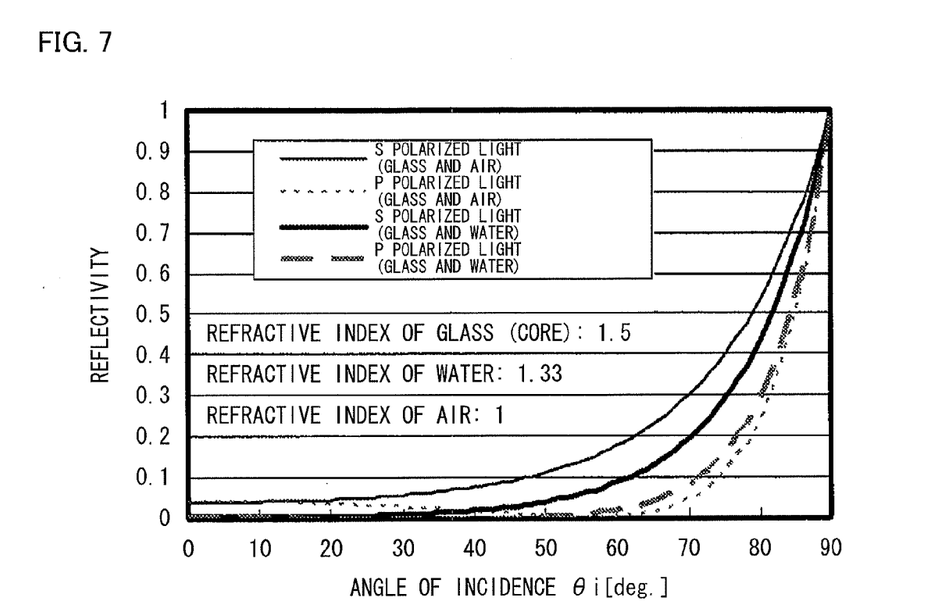
FIG. 7 is a graph showing a relationship between an angle of incidence and Fresnel reflectivity of a cut surface of a fiber.

As described earlier, in a case of an optical fiber whose core has an NA of 0.21 and a refractive index of 1.5 and whose first cladding has an NA of 0.46 and a refractive index of 1.45, the angle α of the cut surface, from which reflected light is to be coupled with the backward-propagating cladding mode, is approximately 8.0 degrees to approximately 18.2 degrees. In a case where the cut surface that causes Fresnel reflection is assumed to be an interface between glass and air, the Fresnel reflectivity here is approximately 4% (see FIG. 7). That is, by setting the reflectivity of the SFBG 31 of the delivery fiber 30 to be 4% or greater, it is possible to determine that there is a break in the delivery fiber 30 when the reflectivity becomes 4% or less.

Figure 11:
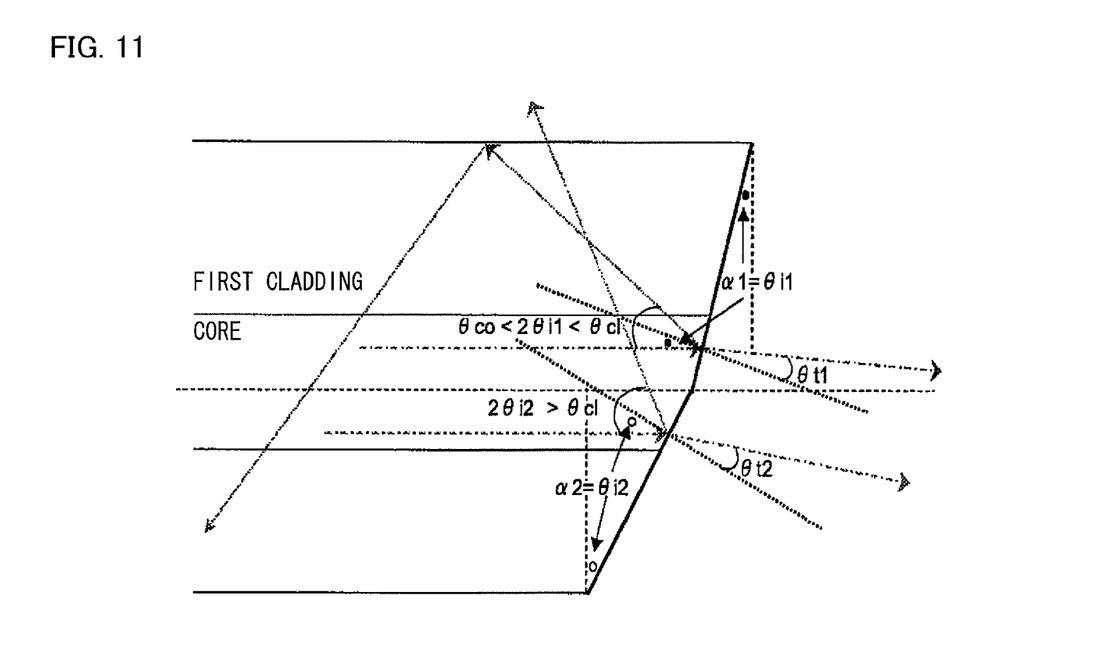
FIG. 11 is a view showing Fresnel reflection in a case where a break occurs in a fiber such that a cut surface of the fiber is not at a constant angle.

The foregoing descriptions based on FIGS. 8 to 10 are on the assumption that the cut surface of a fiber is uniform. However, if a break actually occurs, a cut surface of the fiber resulting from the break has a more complicated shape. FIG. 11 shows a case where a cut surface of an optical fiber is made up of (i) a first cut plane having an angle of α1 and (ii) a second cut plane having an angle of α2. FIG. 11 is based on the assumption that the first cut plane and the second cut plane are equal in size and are divided by a border passing through the center of the cut surface of the fiber. Further, it is assumed that total Fresnel reflection light shown in FIG. 11 is divided equally into (i) light coupled from the first cut plane with a cladding mode and (ii) light emitted from the second cut plane to the outside of the optical fiber. Accordingly, the reflectivity of light that is reflected by total Fresnel reflection at the cut surface of the optical fiber and coupled with a cladding mode is expected to be approximately 2%.

Based on the foregoing concept, consider a case where the cut surface has a more complicated shape. It is possible to easily understand that the reflectivity of light that is reflected by Fresnel reflection and coupled with the cladding mode varies from 0% to 4%. That is, by setting the reflectivity of the SFBG 31 to be 4% or greater, it is possible to unfailingly detect a break in the delivery fiber 30 when the reflectivity becomes 4% or less.

Note, however, that the reflectivity at a cut surface when a break occurs in an optical fiber may not be constant. For example, a break in an optical fiber occurs in such a manner that a small crack occurs first and then the crack grows to a complete break. That is, the shape of the cut surface changes over time from when a break starts to develop to when the break is completed. Further, in a case where laser light is high-power light like the present embodiment, the shape of the cut surface keeps changing due to heat etc. generated by the laser light even after a break has occurred in a fiber. As the shape of the cut surface changes, the Fresnel reflectivity also changes. Therefore, in fact, even in a case where the reflectivity of the SFBG is set within a range of variation in the Fresnel reflectivity, it is possible to detect a break in a fiber.

In a case where the reflectivity of the SFBG is set within a range of variation in the Fresnel reflectivity, it is only necessary to (i) detect the reflectivity which changes during development of a break in a fiber and (ii) determine that there is the break when a variation from normal reflectivity has reached a certain value or greater. The variation here is found preferably on the basis of the output stability of a fiber laser. Specifically, the variation from the normal reflectivity can be obtained as a change of the reflectivity, which is defined as the proportion of (i) the intensity of backward-propagating light in the cladding mode which propagates through the first cladding 30B to (ii) the intensity of laser light that propagates through the core 30A of the delivery fiber 30. It should be noted that the reflectivity of the SFBG needs to be greater than a coupling rate, which is the proportion of light coupled by Rayleigh scattering with the backward-propagating cladding mode, for the following reason. Here, the reflectivity indicates the proportion of (i) light that is reflected and coupled with a backward-propagating cladding mode to (ii) original laser light, and the coupling rate indicates the proportion of (i) light that is scattered and coupled with the backward-propagating cladding mode to (ii) original laser light. Even if a break occurs in a fiber upstream from the SFBG, in a case where light reflected by Fresnel reflection is not at all coupled with the cladding mode, the backward-propagating light in cladding mode is made up only of light scattered by Rayleigh scattering. In this case, if the reflectivity of the SFBG is too small as compared to the proportion of light that is coupled by Rayleigh scattering with the backward-propagating cladding mode, it is difficult to recognize a change in the amount of the backward-propagating light in the cladding mode, which light had been caused by Rayleigh scattering and detected until a break occurred. Note, however, that the amount of the backward-propagating light in the cladding mode caused by Rayleigh scattering is not so large. Therefore, the reflectivity of the SFBG of approximately 1% seems large enough for backward-propagating light in the cladding mode caused by the SFBG and backward-propagating light in the cladding mode caused by Rayleigh scattering to be distinguished.

As has been described, it is possible to detect a break in a fiber even in a case where the reflectivity of the SFBG is set within a range of variation in the Fresnel reflectivity. However, it is preferable that the reflectivity of the SFBG 31 is greater than the Fresnel reflectivity, because this makes it possible to unfailingly detect a break. Even in a case where the reflectivity of the SFBG is set to be greater than the Fresnel reflectivity, the reflectivity of the SFBG can be set small provided that the Fresnel reflectivity is small. Setting the reflectivity of the SFBG to be small makes it possible to increase the proportion of laser light to be outputted, because the proportion of laser light to be taken out for monitoring thereof becomes small. This is preferable because the power efficiency of a laser is increased.

Fresnel reflection can be reduced by causing, the refractive index of a medium that makes contact with a cut surface of an optical fiber when a break occurs, to be close to the refractive index of a core (in this case, glass; refractive index is 1.5) of the optical fiber. The foregoing description was based on the assumption that a medium that makes contact with a cut surface of a fiber when a break occurs is air (refractive index: 1). By changing the medium from air to for example water (refractive index: 1.33), it is possible to reduce the Fresnel reflectivity to 1% or less (see FIG. 7). Specifically, such a configuration can be realized by modifying the configuration shown in FIG. 1 such that for example the delivery fiber 30 is surrounded by water by filling the protection hose 33 with water. Note that the medium that makes contact with the cut surface of the fiber when a break occurs is not limited to water like above. The medium can be any medium provided that the medium is a fluid medium that has a refractive index closer to the refractive index of the core of the optical fiber than that of air is.

Note that, as the intensity of laser light from the fiber laser changes, the intensity of backward-propagating light in the cladding mode to be detected also changes. Therefore, by previously finding the ratio of the intensity of laser light to the intensity of backward-propagating light in the cladding mode to be detected, it is possible to determine whether the detected light is light reflected by the SFBG, light reflected by Fresnel reflection and/or light reflected by Rayleigh scattering.

As has been described, a light intensity monitoring circuit of the present invention includes: a delivery fiber constituted by a double cladding fiber including (i) a core, (ii) a first cladding that encloses the core and (iii) a second cladding that encloses the first cladding; reflecting means for reflecting a part of laser light that propagates in the core of the delivery fiber, thereby coupling the part of the laser light with a backward-propagating cladding mode that propagates in the first cladding in a backward direction, the reflecting means being provided on an output end side of the delivery fiber; and detecting means for detecting intensity of backward-propagating light in a cladding mode which light is the part of the laser light coupled by the reflecting means with the backward-propagating cladding mode, the detecting means being provided on an input end side of the delivery fiber.

According to the configuration, (i) the part of the laser light propagating in the core is fed back by the reflecting means to the input end side as the backward-propagating light in the cladding mode, which reflecting means is provided on the output end side of the delivery fiber and (ii) the intensity of the backward-propagating light in the cladding mode is detected by the detecting means provided on the input end side of the delivery fiber. Accordingly, detection of the intensity of laser light outputted through the output end part and detection of a break in the delivery fiber do not have to be carried out at the output end side of the delivery fiber. This makes it possible to prevent the output end part from becoming larger than necessary and prevent a structure that realizes communication between the output end part and a main body from becoming complicated.

Further, the light intensity monitoring circuit is preferably configured such that the reflecting means is a slanted fiber Bragg grating. According to the configuration, it is possible to easily form the reflecting means without configuring the delivery fiber in a complicated manner.

Further, the light intensity monitoring circuit can be configured such that the detecting means includes: a directional coupler for coupling only the backward-propagating light in the cladding mode which light propagates in the first cladding; and a light detector for receiving the backward-propagating light in the cladding mode coupled by the directional coupler. Alternatively, the light intensity monitoring circuit can be configured such that the detecting means includes: a part, of the delivery fiber, which is near the input end of the delivery fiber and in which the second cladding has been removed; a detection fiber; a high-refractive-index medium for coupling, with the detection fiber, light leaked from the part of the delivery fiber by surrounding the part of the delivery fiber and an end portion of the detection fiber, the high-refractive-index medium having a higher refractive index than the first cladding of the delivery fiber; and a light detector for receiving the light coupled with the detection fiber.

Alternatively, the light intensity monitoring circuit can be configured such that a part, of the delivery fiber, which is near the input end of the delivery fiber and in which the second cladding has been removed; a high-refractive-index medium for scattering light leaked from the part of the delivery fiber by surrounding the part of the delivery fiber, the high-refractive-index medium having a higher refractive index than the first cladding of the delivery fiber; and a light detector for receiving the light scattered by the high-refractive-index medium.

According to the configuration, it is possible to detect the intensity of the laser light without direct detection of the laser light that propagates in the core.

The light intensity monitoring circuit can further include an optical isolator provided so as to be closer to the output end than the reflecting means is.

The light intensity monitoring circuit can be configured such that reflectivity of the reflecting means is greater than a coupling rate, which indicates proportion of light that is reflected by Fresnel reflection and coupled with the backward-propagating cladding mode, the Fresnel reflection occurring at an interface resulted from a break in the delivery fiber.

According to the configuration, the detecting means is capable of unfailingly determining that there is a break in the delivery fiber when the reflectivity of the detected backward-propagating light in the cladding mode is smaller than the reflectivity of the reflecting means.

The light intensity monitoring circuit can be configured such that: the delivery fiber is provided inside a protection hose; and the protection hose is filled with a fluid medium whose refractive index is closer to a refractive index of the core of the delivery fiber than a refractive index of air is.

According to the configuration, when a break occurs in the delivery fiber, the fluid medium makes contact with a cut surface of the fiber where there is the break. The refractive index of the fluid medium is closer to the refractive index of the core of the delivery fiber than that of air is. Therefore, it is possible to reduce Fresnel reflection at a cut surface as compared to a case where air is used as the medium that makes contact with the cut surface of the fiber when a break occurs in the fiber. In a case where Fresnel reflection at the cut surface is small, it is possible to detect a break even if the reflectivity of the reflecting means is small. Therefore, it is possible to reduce the proportion of laser light that is taken out for monitoring thereof and to increase the proportion of laser light to be outputted, and thus possible to increase the power efficiency of a laser.

The light intensity monitoring circuit can be configured such that: reflectivity of the reflecting means is greater than a coupling rate, which indicates proportion of light that is scattered by Rayleigh scattering and coupled with the backward-propagating cladding mode of the delivery fiber; and the detecting means detects a change over time in intensity of the backward-propagating light in the cladding mode which light propagates through the first cladding.

According to the configuration, it is possible to detect the reflectivity which changes during development of a break in a fiber, by detecting a change over time in the intensity of the backward-propagating light in the cladding mode. Accordingly, even in a case where the reflectivity of the reflecting means is set within a range of variation in the Fresnel reflectivity, it is possible to determine that there is a break when, while detecting the change over time, a variation from the normal reflectivity has reached a certain value or greater. That is, by setting the reflectivity of the reflecting means within a range of variation in the Fresnel reflectivity, it is possible to reduce the proportion of laser light that is taken out for monitoring thereof and to increase the proportion of laser light to be outputted, and thus possible to increase the power efficiency of a laser.

The present invention is not limited to the descriptions of the respective embodiments, but may be altered within the scope of the claims. An embodiment derived from a proper combination of technical means disclosed in different embodiments is encompassed in the technical scope of the invention.

INDUSTRIAL APPLICABILITY

The present invention provides a light intensity monitor that is capable of detecting the intensity of laser light and fiber breaking even in a case where high-power light propagates in the delivery fiber. The present invention is usable in a fiber laser system.

REFERENCE SIGNS LIST

10 Fiber laser device
11 Fiber laser
20 Output end of laser
30 Delivery fiber
30A Core
30B First cladding
30C Second cladding
31 Slanted fiber Bragg grating (reflecting means)
32 Backward-propagating cladding mode detecting section (detecting means)
32A Directional coupler
32B Light detector
32C Detection fiber
32D High-refractive-index medium
33 Protection hose

The invention claimed is:

1. A light intensity monitoring circuit comprising:
a delivery fiber constituted by a double cladding fiber including (i) a core, (ii) a first cladding that encloses the core and (iii) a second cladding that encloses the first cladding;
reflecting means for reflecting a part of laser light that propagates in the core of the delivery fiber, thereby coupling the part of the laser light with a backward-propagating cladding mode that propagates in the first cladding in a backward direction, the reflecting means being provided on an output end side of the delivery fiber; and
detecting means for detecting intensity of backward-propagating light in a cladding mode which light is the part of the laser light coupled by the reflecting means with the backward-propagating cladding mode, the detecting means being provided on an input end side of the delivery fiber;
wherein the detecting means includes:
a part, of the delivery fiber, which is near the input end of the delivery fiber and in which the second cladding has been removed;

a detection fiber;
a high-refractive-index medium for coupling, with the detection fiber, light leaked from the part of the delivery fiber by surrounding the part of the delivery fiber and an end portion of the detection fiber, the high-refractive-index medium having a higher refractive index than the first cladding of the delivery fiber; and
a light detector for receiving the light coupled with the detection fiber.

2. The light intensity monitoring circuit according to claim 1, wherein the reflecting means is a slanted fiber Bragg grating.

3. A light intensity monitoring circuit according to claim 1, further comprising an optical isolator provided closer to the output end than the reflecting means.

4. A fiber laser system comprising:
a light intensity monitoring circuit recited in claim 1;
a fiber laser device; and
a laser output end part,
the fiber laser device and the laser output end part being connected via a delivery fiber included in the light intensity monitoring circuit.

5. A light intensity monitoring circuit comprising:
a delivery fiber constituted by a double cladding fiber including (i) a core, (ii) a first cladding that encloses the core and (iii) a second cladding that encloses the first cladding;
reflecting means for reflecting a part of laser light that propagates in the core of the delivery fiber, thereby coupling the part of the laser light with a backward-propagating cladding mode that propagates in the first cladding in a backward direction, the reflecting means being provided on an output end side of the delivery fiber; and
detecting means for detecting intensity of backward-propagating light in a cladding mode which light is the part of the laser light coupled by the reflecting means with the backward-propagating cladding mode, the detecting means being provided on an input end side of the delivery fiber;
wherein the detecting means includes:
a part, of the delivery fiber, which is near the input end of the delivery fiber and in which the second cladding has been removed;
a high-refractive-index medium for scattering light leaked from the part of the delivery fiber by surrounding the part of the delivery fiber, the high-refractive-index medium having a higher refractive index than the first cladding of the delivery fiber; and
a light detector for receiving the light scattered by the high-refractive-index medium.

6. The light intensity monitoring circuit according to claim 5, wherein the reflecting means is a slanted fiber Bragg grating.

7. A light intensity monitoring circuit according to claim 5, further comprising an optical isolator provided closer to the output end than the reflecting means.

8. A fiber laser system comprising:
a light intensity monitoring circuit recited in claim 5;
a fiber laser device; and
a laser output end part,
the fiber laser device and the laser output end part being connected via a delivery fiber included in the light intensity monitoring circuit.

9. A light intensity monitoring circuit comprising:
a delivery fiber constituted by a double cladding fiber including (i) a core, (ii) a first cladding that encloses the core and (iii) a second cladding that encloses the first cladding;
reflecting means for reflecting a part of laser light that propagates in the core of the delivery fiber, thereby coupling the part of the laser light with a backward-propagating cladding mode that propagates in the first cladding in a backward direction, the reflecting means being provided on an output end side of the delivery fiber; and
detecting means for detecting intensity of backward-propagating light in a cladding mode which light is the part of the laser light coupled by the reflecting means with the backward-propagating cladding mode, the detecting means being provided on an input end side of the delivery fiber;
wherein reflectivity of the reflecting means is greater than a coupling rate, which indicates proportion of light that is reflected by Fresnel reflection and coupled with the backward-propagating cladding mode, the Fresnel reflection occurring at an interface resulted from a break in the delivery fiber.

10. The light intensity monitoring circuit according to claim 9, wherein:
the delivery fiber is provided inside a protection hose; and
the protection hose is filled with a fluid medium whose refractive index is closer to a refractive index of the core of the delivery fiber than a refractive index of air.

11. The light intensity monitoring circuit according to claim 9, wherein the reflecting means is a slanted fiber Bragg grating.

12. The light intensity monitoring circuit according to claim 9, wherein the detecting means includes:
a directional coupler for coupling only the backward-propagating light in the cladding mode which light propagates in the first cladding; and
a light detector for receiving the backward-propagating light in the cladding mode coupled by the directional coupler.

13. A light intensity monitoring circuit according to claim 9, further comprising an optical isolator provided closer to the output end than the reflecting means.

14. A fiber laser system comprising:
a light intensity monitoring circuit recited in claim 9;
a fiber laser device; and
a laser output end part,
the fiber laser device and the laser output end part being connected via a delivery fiber included in the light intensity monitoring circuit.

15. The light intensity monitoring circuit according to claim 10, wherein the reflecting means is a slanted fiber Bragg grating.

16. The light intensity monitoring circuit according to claim 10, wherein the detecting means includes:
a directional coupler for coupling only the backward-propagating light in the cladding mode which light propagates in the first cladding; and
a light detector for receiving the backward-propagating light in the cladding mode coupled by the directional coupler.

17. A light intensity monitoring circuit according to claim 10, further comprising an optical isolator provided closer to the output end than the reflecting means.

18. A fiber laser system comprising:
a light intensity monitoring circuit recited in claim 10;
a fiber laser device; and
a laser output end part,
the fiber laser device and the laser output end part being connected via a delivery fiber included in the light intensity monitoring circuit.

19. A light intensity monitoring circuit comprising:
a delivery fiber constituted by a double cladding fiber including (i) a core, (ii) a first cladding that encloses the core and (iii) a second cladding that encloses the first cladding;
reflecting means for reflecting a part of laser light that propagates in the core of the delivery fiber, thereby coupling the part of the laser light with a backward-propagating cladding mode that propagates in the first cladding in a backward direction, the reflecting means being provided on an output end side of the delivery fiber; and
detecting means for detecting intensity of backward-propagating light in a cladding mode which light is the part of the laser light coupled by the reflecting means with the backward-propagating cladding mode, the detecting means being provided on an input end side of the delivery fiber;
wherein:
reflectivity of the reflecting means is greater than a coupling rate, which indicates proportion of light that is scattered by Rayleigh scattering and coupled with the backward-propagating cladding mode of the delivery fiber; and
the detecting means detects a change over time in the proportion of (i) the intensity of the backward-propagating light in the cladding mode which light propagates through the first cladding to (ii) the intensity of the laser light which propagates through the core of the delivery fiber.

20. The light intensity monitoring circuit according to claim 19, wherein the reflecting means is a slanted fiber Bragg grating.

21. The light intensity monitoring circuit according to claim 19, wherein the detecting means includes:
a directional coupler for coupling only the backward-propagating light in the cladding mode which light propagates in the first cladding; and
a light detector for receiving the backward-propagating light in the cladding mode coupled by the directional coupler.

22. A light intensity monitoring circuit according to claim 19, further comprising an optical isolator provided closer to the output end than the reflecting means.

23. A fiber laser system comprising:
a light intensity monitoring circuit recited in claim 19;
a fiber laser device; and
a laser output end part,
the fiber laser device and the laser output end part being connected via a delivery fiber included in the light intensity monitoring circuit.

* * * * *